(12) United States Patent
Teal et al.

(10) Patent No.: US 9,359,556 B2
(45) Date of Patent: *Jun. 7, 2016

(54) BIOMASS TORREFACTION SYSTEM AND METHOD

(71) Applicant: Teal Sales Incorporated, Lynnwood, WA (US)

(72) Inventors: William B. Teal, Woodway, WA (US); Richard J. Gobel, Mill Creek, WA (US); Andrew Johnson, Redmond, WA (US)

(73) Assignee: Teal Sales Incorporated, Lynnwood, WA (US)

( * ) Notice: Subject to any disclaimer, the term of this patent is extended or adjusted under 35 U.S.C. 154(b) by 549 days.

This patent is subject to a terminal disclaimer.

(21) Appl. No.: 13/856,591

(22) Filed: Apr. 4, 2013

(65) Prior Publication Data
US 2013/0228444 A1    Sep. 5, 2013

Related U.S. Application Data

(63) Continuation of application No. PCT/US2011/055153, filed on Oct. 6, 2011, which is a continuation of application No. 13/218,230, filed on Aug. 25, 2011, now Pat. No. 8,246,788.

(60) Provisional application No. 61/391,442, filed on Oct. 8, 2010.

(51) Int. Cl.
*C10B 1/10*    (2006.01)
*C07C 1/00*    (2006.01)
(Continued)

(52) U.S. Cl.
CPC . *C10B 53/02* (2013.01); *C10B 1/10* (2013.01); *C10B 49/02* (2013.01); *C10B 49/06* (2013.01);
(Continued)

(58) Field of Classification Search
CPC .............. C10B 1/10; C10B 1/00; C10B 7/10; C10B 47/44; C10L 5/00; C07C 1/00
USPC ............ 585/240; 202/96, 100, 118, 136, 238; 201/25; 44/605
See application file for complete search history.

(56) References Cited

U.S. PATENT DOCUMENTS 2,135,934 A    11/1938  Blasier
3,749,033 A    7/1973   Sugano et al.
(Continued)

FOREIGN PATENT DOCUMENTS

CA    2 580 389 A1    4/2006
CA    2 681 282 A1    4/2010
(Continued)

OTHER PUBLICATIONS

International Search Report, for International Application No. PCT/US2011/055153, mailed Jan. 20, 2012, 4 pages.
(Continued)

*Primary Examiner* — Nina Bhat
(74) *Attorney, Agent, or Firm* — Seed IP Law Group PLLC

(57) ABSTRACT

A biomass torrefaction system is provided which enables a continuous torrefaction process that involves the introduction of biomass particles into a rotating reactor drum having a low oxygen environment. The particles are conveyed through the drum by a heated gas stream and simultaneously torrefied thereby. Gas exiting the drum is recirculated back to a heat source for reheating the gas prior to reentering the drum. A method of biomass torrefaction is also provided.

20 Claims, 9 Drawing Sheets

(51) Int. Cl.

| | | |
|---|---|---|
| *C10B 53/02* | (2006.01) | |
| *C10B 49/02* | (2006.01) | |
| *C10L 5/44* | (2006.01) | |
| *C10L 9/08* | (2006.01) | |
| *F27B 7/20* | (2006.01) | |
| *F27D 17/00* | (2006.01) | |
| *C10B 49/06* | (2006.01) | |

(52) U.S. Cl.
CPC . *C10L 5/44* (2013.01); *C10L 9/083* (2013.01); *F27B 7/20* (2013.01); *F27D 17/004* (2013.01); *F27D 17/008* (2013.01); *Y02E 50/10* (2013.01); *Y02E 50/14* (2013.01); *Y02E 50/15* (2013.01); *Y02E 50/30* (2013.01)

(56) References Cited

U.S. PATENT DOCUMENTS

| | | | |
|---|---|---|---|
| 4,553,978 | A | 11/1985 | Yvan |
| 4,787,917 | A | 11/1988 | Leclerc de Bussy |
| 5,720,232 | A | 2/1998 | Meador |
| 5,997,289 | A | 12/1999 | Dover |
| 6,226,889 | B1 | 5/2001 | Aulbaugh et al. |
| 7,942,942 | B2 | 5/2011 | Paoluccio |
| 7,993,709 | B2 | 8/2011 | Brunet |
| 8,246,788 | B2 * | 8/2012 | Teal ............ C10B 1/10 202/100 |
| 8,252,966 | B2 * | 8/2012 | Teal ............ C10B 1/10 44/605 |
| 2003/0221363 | A1 | 12/2003 | Reed |
| 2004/0182001 | A1 | 9/2004 | Masemore et al. |
| 2006/0280669 | A1 * | 12/2006 | Jones ............ C10B 7/10 423/445 R |
| 2007/0266623 | A1 | 11/2007 | Paoluccio |
| 2008/0022595 | A1 | 1/2008 | Lemaire et al. |
| 2008/0223269 | A1 | 9/2008 | Paoluccio |
| 2008/0263891 | A1 | 10/2008 | Brunet |
| 2009/0007484 | A1 | 1/2009 | Smith |
| 2009/0077892 | A1 | 3/2009 | Shulenberger et al. |
| 2009/0084029 | A1 | 4/2009 | Bergman |
| 2009/0151251 | A1 | 6/2009 | Manzer et al. |
| 2009/0151253 | A1 | 6/2009 | Manzer et al. |
| 2009/0183431 | A1 | 7/2009 | Smit et al. |
| 2009/0193679 | A1 * | 8/2009 | Guyomarc'h ...... C10B 53/02 34/467 |
| 2009/0250331 | A1 | 10/2009 | Hopkins et al. |
| 2009/0272027 | A1 | 11/2009 | Ruiters |
| 2010/0083530 | A1 | 4/2010 | Weisselberg et al. |
| 2010/0101141 | A1 | 4/2010 | Shulenberger et al. |
| 2010/0242351 | A1 | 9/2010 | Causer |
| 2010/0242353 | A1 | 9/2010 | Jovanovic et al. |
| 2010/0251616 | A1 | 10/2010 | Paoluccio et al. |
| 2010/0258429 | A1 | 10/2010 | Ugolin |
| 2010/0270505 | A1 | 10/2010 | Gallaspy et al. |
| 2010/0270506 | A1 | 10/2010 | Goetsch et al. |
| 2010/0273899 | A1 | 10/2010 | Winter |
| 2011/0041392 | A1 * | 2/2011 | Stromberg ........ C10L 5/363 44/607 |
| 2011/0041405 | A1 | 2/2011 | Hannemann et al. |
| 2011/0056090 | A1 | 3/2011 | Larsson et al. |
| 2011/0057060 | A1 | 3/2011 | Sprouse |
| 2011/0146156 | A1 | 6/2011 | Kara et al. |
| 2011/0154684 | A1 | 6/2011 | Lundgen et al. |
| 2011/0167713 | A1 | 7/2011 | Quignard et al. |
| 2011/0173888 | A1 | 7/2011 | Hitchingham et al. |
| 2011/0179700 | A1 | 7/2011 | Monroe et al. |
| 2011/0179701 | A1 * | 7/2011 | Grassi ............ C10L 5/442 44/606 |
| 2011/0206571 | A1 | 8/2011 | Skinner et al. |

FOREIGN PATENT DOCUMENTS

| | | |
|---|---|---|
| CA | 2 683 139 A1 | 4/2011 |
| CA | 2 686 099 A1 | 4/2011 |
| CA | 2 684 107 A1 | 5/2011 |
| CN | 201041457 Y | 3/2008 |
| CN | 201140098 Y | 10/2008 |
| EP | 2 592 758 A1 | 7/1987 |
| EP | 0 345 336 | 12/1989 |
| EP | 1 099 084 | 5/2001 |
| EP | 2 017 325 A2 | 1/2009 |
| EP | 2 044 369 | 4/2009 |
| EP | 2 189 512 A1 | 5/2010 |
| EP | 2 218 300 | 8/2010 |
| EP | 2 343 349 A1 | 7/2011 |
| FR | 2 594 134 A1 | 8/1987 |
| FR | 2 624 876 A1 | 6/1989 |
| FR | 2 628 003 A2 | 9/1989 |
| FR | 2 944 344 A1 | 10/2010 |
| FR | 2 945 033 A1 | 11/2010 |
| FR | 2 946 131 A1 | 12/2010 |
| FR | 2 952 068 A1 | 5/2011 |
| FR | 2 955 118 A1 | 7/2011 |
| FR | 2 955 175 A1 | 7/2011 |
| NL | 1029909 C2 | 3/2007 |
| NL | 1032001 C2 | 12/2007 |
| TW | 201127492 A1 | 8/2011 |
| WO | WO 89/05847 A1 | 6/1989 |
| WO | WO 00/04328 A1 | 1/2000 |
| WO | WO 2005/056723 A1 | 6/2005 |
| WO | WO 2006/087485 A1 | 8/2006 |
| WO | WO 2007/078199 A1 | 7/2007 |
| WO | WO 2008/000960 A2 | 1/2008 |
| WO | WO 2008/107044 A1 | 9/2008 |
| WO | WO 2009/095564 A2 | 8/2009 |
| WO | WO 2010/068099 A1 | 6/2010 |
| WO | WO 2010/068773 A1 | 6/2010 |
| WO | WO 2010/115563 A2 | 10/2010 |
| WO | WO 2010/128209 A1 | 11/2010 |
| WO | WO 2010/132971 A2 | 11/2010 |
| WO | WO 2011/001410 A1 | 1/2011 |
| WO | WO 2011/051637 A1 | 5/2011 |
| WO | WO 2011/062488 A1 | 5/2011 |

OTHER PUBLICATIONS

Teal et al., "Biomass Torrefaction System and Method," Office Action, for U.S. Appl. No. 13/218,230, mailed May 15, 2012, 16 pages.

Teal Sales Inc., "TSI Dryer Technology," presentation brochure, relating to dryer systems in commercial use prior to Sep. 2010, 11 pages.

Written Opinion of the International Searching Authority, for International Application No. PCT/US2011/055153, mailed Jan. 20, 2012, 7 pages.

* cited by examiner

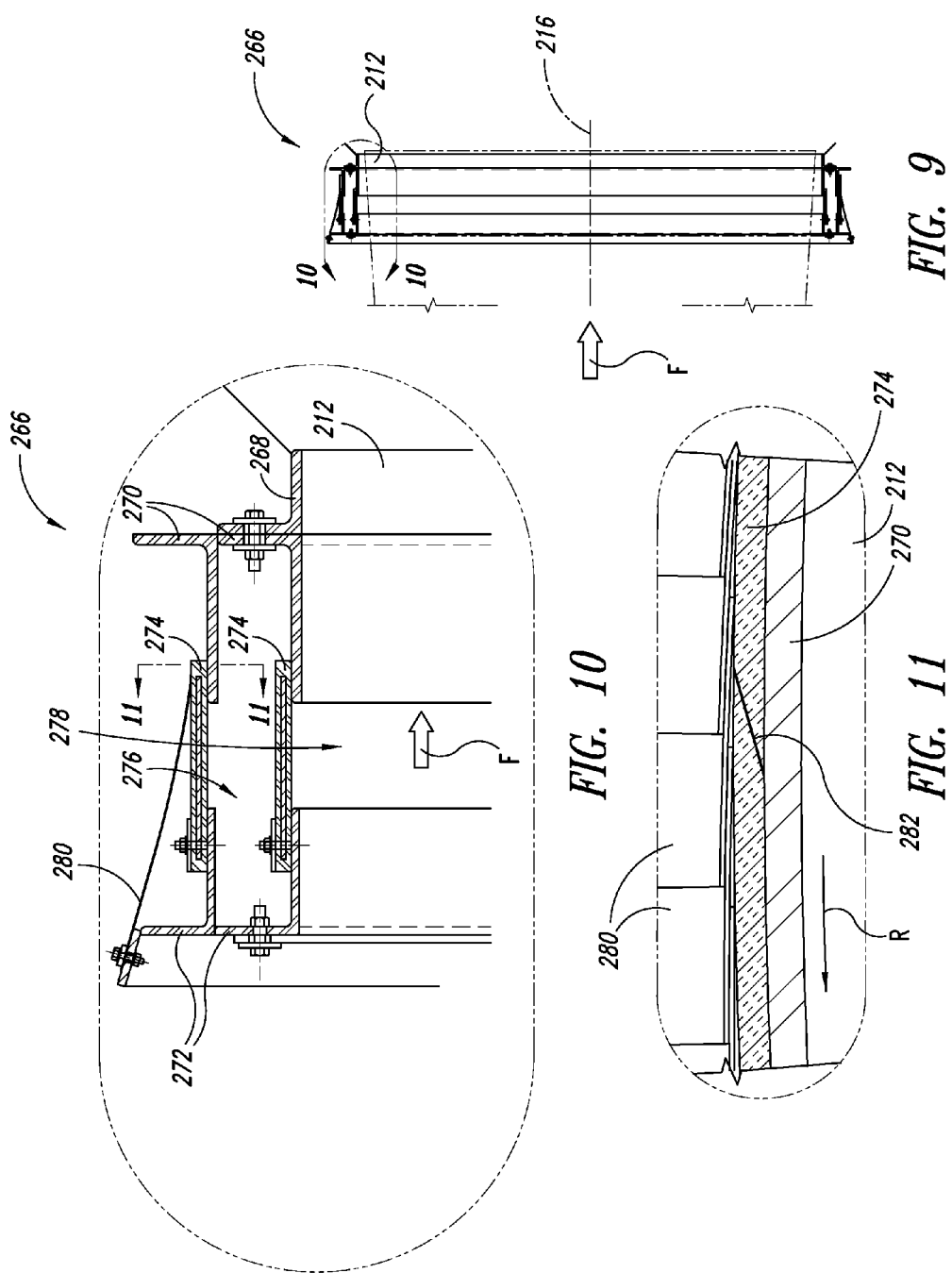

BIOMASS TORREFACTION SYSTEM AND METHOD

CROSS-REFERENCE TO RELATED APPLICATIONS

This application is a continuation application of International Application No. PCT/US2011/055153, accorded an International Filing Date of Oct. 6, 2011, which claims the benefit of the filing date of U.S. Provisional Application No. 61/391,442, filed Oct. 8, 2010 and U.S. patent application Ser. No. 13/218,230, filed Aug. 25, 2011, the entire contents of which are incorporated herein by reference for all purposes.

BACKGROUND

1. Technical Field

This disclosure generally relates to biomass torrefaction systems and methods, including in particular cellulosic biomass torrefaction systems and methods.

2. Description of the Related Art

Torrefaction of biomass particles is well known and is a process in which biomass particles are heated in a low oxygen environment. This causes volatile compounds within the particles to be boiled off and the cellular structure of the particles to be degraded, resulting in a partial loss of mass and an increase in friability. It also causes a reaction within the remaining cellular structure that enhances the moisture resistance of the product. Torrefied particles have an enhanced energy value when measured in terms of heat energy per unit of weight. The degree of torrefaction of biomass particles depends on several factors, including the level of heat applied, the length of time the heat is applied, and surrounding gas conditions (particularly with respect to oxygen level).

Current systems strive to mechanically control the variables of heat, residence time and oxygen levels to achieve consistent torrefied particles. Typical mechanisms intended to torrefy biomass particles under low level oxygen conditions use mechanical means to convey the particles (such as rotating trays or screws) and apply heat to the conveying surfaces for conduction to the particles to be torrefied. Such mechanisms suffer from a variety of drawbacks, including being difficult or impossible to significantly scale up in capacity. As the demand for torrefied biomass increases, the limited capacity of current mechanisms has become an issue impeding the use of such biomass. Consequently, Applicant believes improved methods and systems able to consistently and efficiently produce torrefied biomass particles are desirable. These methods and systems should be based on principles and concepts that allow tight process control while achieving large capacities, to meet growing demand.

BRIEF SUMMARY

Embodiments described herein provide biomass torrefaction systems and methods which are particularly well adapted for torrefying biomass particles (including in particular cellulosic biomass particles) of various sizes in an efficient and consistent manner. The systems and methods are readily scalable to meet a wide variety of industry needs and provide enhanced process control with respect to monitoring and adjusting operational parameters to optimize or tailor characteristics of the resultant torrefied biomass particles.

According to one embodiment, a biomass torrefaction system may be summarized as including an inlet to receive biomass particles; a reactor drum configured to rotate about its longitudinal axis, the reactor drum having a plurality of flights positioned therein at a plurality of locations along the length of the reactor drum; a heat source upstream of the reactor drum to heat gas contained in the system to a temperature sufficient to torrefy the biomass particles during operation; a fan device coupled to the system to create, when the system is in operation, a flow of heated gas through the reactor drum sufficient to intermittently transport the biomass particles along the length of the reactor drum as the biomass particles are lifted by the flights and showered through the heated gas stream as the reactor drum rotates; and gas ducts coupled to at least the reactor drum, heat source and fan device to recirculate a portion of gas exiting the reactor drum back to the heat source to reheat the gas for reintroduction into the reactor drum.

The heated gas stream directly heats the biomass particles as the gas stream intermittently transports the biomass particles through the reactor drum. The lifting flights may be configured to regulate movement of the biomass particles through the reactor drum, thereby influencing the retention time of the biomass particles within the reactor drum. The lifting flights may include flights spaced around an inner circumference of the reactor drum in regular or irregular intervals and in at least three locations along the longitudinal length of the reactor drum. The lifting flights interoperate with the heated gas stream to classify the biomass particles according to particle density and/or size, by moving relatively denser particles with respect to similarly sized particles and relatively larger particles with respect to particles having similar densities through the reactor drum more slowly.

The biomass torrefaction system may further include a hopper located downstream of the reactor drum to collect torrefied biomass particles exiting the reactor drum and to discharge the torrefied biomass particles from the system. The system may further include ducting to dispel exhaust gas from the system, with control valves and dampers, the control valves and dampers positioned to regulate a pressure level within the system to inhibit the infiltration of oxygen while enabling exhaust gas to exit the system. The ducting may route exhaust gas from the system to a remote device for use of the exhaust gas in an auxiliary or supplemental process. The remote device may be, for example, a burner configured to utilize the exhaust gas for supplying heat via a heat exchanger to the gas which passes through the reactor drum during operation.

The system may further include at least one airlock located between the inlet and the reactor drum to limit the amount of oxygen entering the system when receiving the biomass particles. The system may further include at least one seal mechanism between the reactor drum and adjacent structures, the seal mechanism including a chamber between the reactor drum and an external environment and the seal mechanism coupled to an inert or semi-inert gas source for selective purging of the chamber during a startup or shutdown operation.

The heat source for the system may be an electrical immersion-type duct heater, gas-to-gas heat exchanger, a low-oxygen burner or other conventional heat sources, such as, for example, a waste-wood or other burner which is configured to supply heat indirectly to the gas stream in the biomass torrefaction system.

The biomass torrefaction system may further include a steam plant coupled to the reactor drum to introduce steam into the reactor drum and assist in the torrefaction of the biomass particles. The steam plant may also provide safety smothering and cooling stream functionalities to enhance operational safety.

The biomass torrefaction system may further include a control system configured to selectively adjust the speed of the fan device to regulate the speed and volume of gas through the system. The control system may also be configured to selectively adjust the speed of the rotation of the reactor drum to regulate a time of residence of the biomass particles in the reactor drum. The control system may also be configured to selectively adjust the temperature of the flow of gas through the system. The control system may be configured to selectively adjust parameters of the flow of gas through the system including volume, speed and/or pressure. The control system may also be configured to independently control a plurality of operational parameters to regulate a torrefaction process of the biomass particles, the operational parameters including at least one of a reactor inlet temperature, a reactor outlet temperature, an average residence time, oxygen content of the heated gas stream and gas flow characteristics. The control system may be configured to continuously or intermittingly adjust at least some of the operational parameters during operation to optimize the torrefaction process or tailor characteristics of the resultant torrefied biomass particles.

According to one embodiment, a method of biomass torrefaction may be summarized as including rotating a reactor drum, the reactor drum having a plurality of flights positioned therein at each of a plurality of locations along a longitudinal length of the reactor drum; generating a stream of heated gas through the reactor drum, sufficient to intermittently transport biomass particles along the length of the reactor drum, and simultaneously torrefy the biomass particles as the biomass particles are lifted by the flights and showered through the heated gas stream while the reactor drum rotates; and recirculating a portion of gas exiting the reactor drum back to the inlet of the reactor drum via one or more gas ducts.

The method may further include selectively varying at least some of a plurality of operational parameters to tailor characteristics of the resultant torrefied biomass particles, the operational parameters including at least one of a speed of the heated gas stream through the reactor drum, a volumetric flow rate of the heated gas stream through the reactor drum, a temperature of the heated gas stream through the reactor, a pressure level within the reactor drum, a speed of the rotation of the reactor drum, oxygen content of the heated gas stream, a moisture content of the biomass particles and a rate of introduction of the biomass particles into the reactor drum. The method may further include selectively varying the time of residence of the biomass particles in the reactor drum. The method may further include adjusting the plurality of flights within the reactor drum with respect to location and/or density to regulate the retention time of the biomass particles within the reactor drum. The method may further include passing biomass particles through the reactor drum at different rates according to particle density and/or size. The method may further include discharging torrefied biomass particles while substantially preventing the infiltration of oxygen into the reactor drum. The method may further include establishing a pressure level within the reactor drum to inhibit the infiltration of oxygen into the reactor drum. The method may further include routing exhaust gas to a device remote from the reactor drum for use of the exhaust gas in an auxiliary or supplemental process, such as, for example, use as a fuel for a remote burner.

The method may further include sealing the reactor drum from the external environment and selectively purging one or more chambers adjacent to sealing interfaces of the reactor drum with inert or semi-inert gas. The method may further include passing biomass particles through the reactor drum at a rate between about one to fifty tons per hour, the biomass particles having an energy density of at least 20 gigajoules/ton (GJ/ton) after being torrefied within the reactor drum.

The method may further include drying the biomass particles in a rotary type, conveyor type or other type of dryer system prior to introduction in the reactor drum. Drying biomass particles in the rotary type dryer system prior to introduction in the reactor drum may include drying the biomass particles to have an average moisture content below twenty percent moisture content, wet-weight basis.

The method may further include establishing the heated gas stream such that an inlet temperature of the heated gas stream entering the reactor drum is at least 500° F. and such that an outlet temperature of the heated gas stream exiting the reactor drum is at least 400° F. The method may further include discharging torrefied biomass particles after a single pass of the biomass particles through the reactor drum, particle sizes of the discharged torrefied biomass particles varying by at least ten percent while the energy density and moisture characteristics of the torrefied biomass particles are relatively consistent irrespective of particle size. The method may further include introducing the biomass particles into the drum reactor, the biomass particles having an average size of about 1/16 cubic inch to about one cubic inch upon entry. The method may further include venting the reactor drum upon a fault condition. The method may further include introducing steam into the reactor drum to assist in the torrefaction of the biomass particles. Introducing steam into the reactor drum may include producing steam with a boiler which receives heat from a portion of gas exiting the reactor drum.

BRIEF DESCRIPTION OF THE SEVERAL VIEWS OF THE DRAWINGS

FIG. 9 is a side elevational view of a seal assembly, according to one embodiment, that is usable with the biomass torrefaction system of FIG. 3.

FIG. 10 is an enlarged detail view of a portion of the seal assembly of FIG. 9.

FIG. 11 is a cross-sectional view of the seal assembly of FIG. 9 taken along line 11-11 of FIG. 10.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures or steps associated with industrial process equipment and industrial processes may not be shown or described in detail to avoid unnecessarily obscuring descriptions of the embodiments. For instance, it will be appreciated by those of ordinary skill in the relevant art that various sensors (e.g., temperature sensors, oxygen sensors, etc.), control devices and other industrial process controls may be provided and managed via a programmable logic controller (PLC) or other suitable control system for monitoring the biomass torrefaction systems described herein and controlling operational parameters of the torrefaction processes to optimize or tailor characteristics of the resultant torrefied biomass particles.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
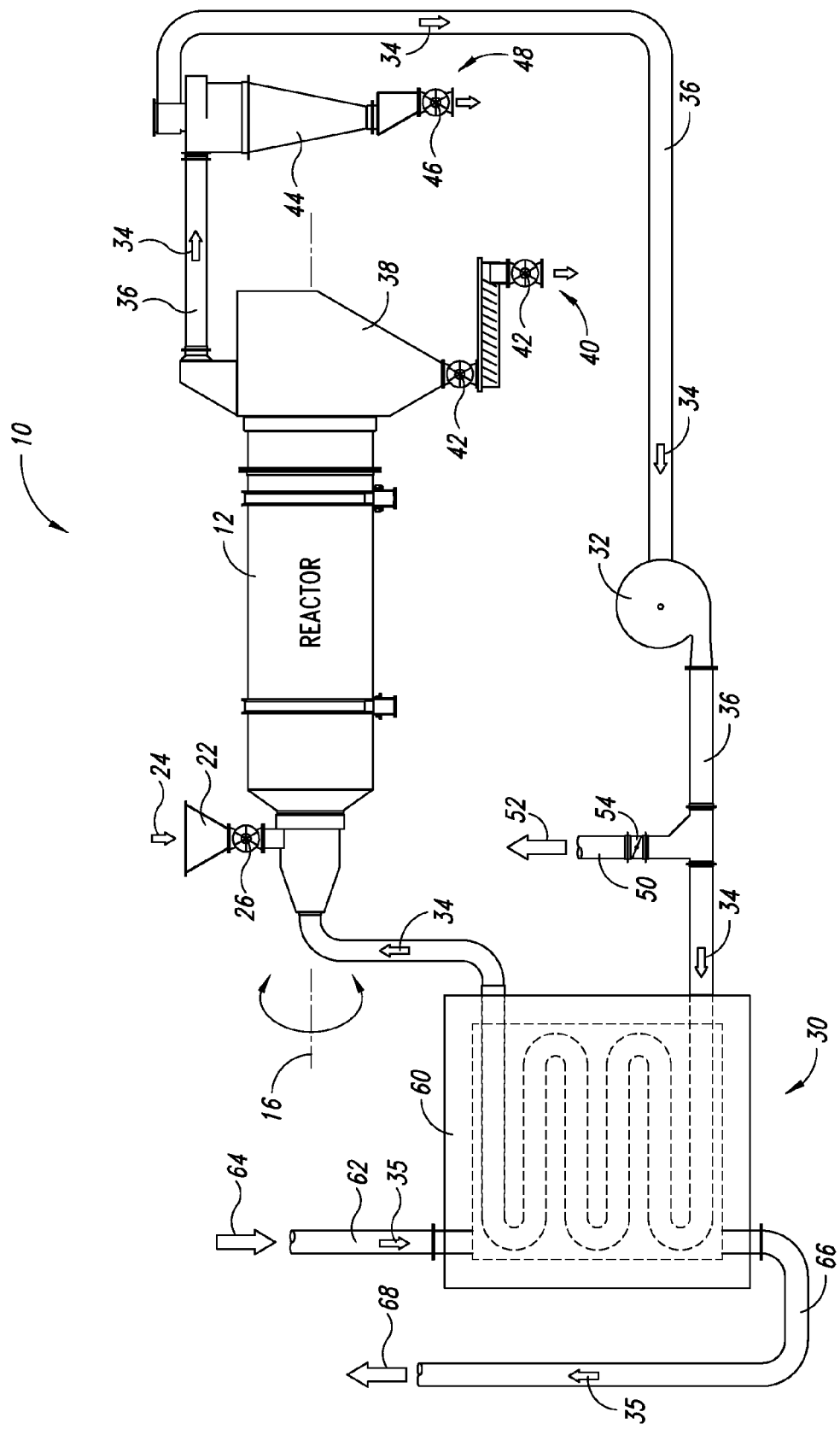
FIG. 1 is a schematic diagram of a biomass torrefaction system according to one embodiment.

FIG. 1 shows a schematic of a biomass torrefaction system 10 according to one example embodiment. The system 10 includes a reactor drum 12 which is supported so as to rotate its longitudinal axis 16. The system 10 further includes an inlet 22 for receiving biomass particles that are to be processed, as represented by the arrow labeled 24. An airlock or dual airlock 26 with optional inert or semi-inert gas purging 27 or similar device is coupled to the inlet 22 to substantially prevent oxygen from entering the system 10 when biomass particles are fed into the system 10. The biomass particles may be fed to the inlet 22 via a conveyor or other conventional material transport mechanism. In one embodiment, a plug-feed screw conveyor may be used in lieu of the airlock(s) to create a plug of material that acts as a seal when passing biomass particles through the inlet 22.

The system 10 further includes a heat source 30 disposed upstream of the reactor drum 12 for supplying heat to a gas stream 34 that is generated within the system 10 by a fan device 32, which may be, for example, an induced draft fan device or a forced draft fan device. The fan device 32 is driven to draw or force gas through the reactor drum 12 and circulate the gas (or a substantial portion of the gas) back to the heat source 30 to be reheated and supplied to the reactor drum 12 in a recirculating manner. In some embodiments, eighty percent or more of the gas by volume exiting the reactor drum 12 may be recirculated to the inlet of the reactor drum 12. In some embodiments, ninety percent or more of the gas by volume exiting the reactor drum 12 is recirculated to the inlet of the reactor drum 12. In some embodiments, ninety-five percent or more of the gas by volume exiting the reactor drum 12 is recirculated to the inlet of the reactor drum 12.

During operation, the gas stream 34 acts as a thermal fluid to carry heat energy to the biomass particles within the reactor drum 12 and to provide momentum for conveyance of the biomass particles. The gas stream may also heat the internal structure of the drum 12, especially the lifting flights, which may also in turn heat the biomass particles. Gas ducts 36 are appropriately sized and coupled to at least the reactor drum 12, heat source 30 and fan device 32 for recirculating the gas stream 34 in the system 10. In some embodiments, a predominate portion or the entire amount of gas entering the reactor drum 12 is recirculated back to the inlet of the reactor drum 12 in a continuous manner while an amount of gas generated by torrefying the biomass particles is exhausted or otherwise routed external the system 10. In some embodiments, no new gas (other than unintended leakage) is supplied to the recirculating gas stream 34 during operation.

In the illustrated embodiment, the heat source 30 is in the form of a gas-to-gas heat exchanger 60. A hot gas stream 35, in the range of about 800° F. to about 1400° F., for example, is supplied to the heat exchanger 60 via an inlet conduit 62, as represented by the arrow labeled 64. The hot gas stream 35 interacts with the recirculating gas stream 34 of the torrefaction system 10 to transfer heat thereto. In some embodiments, the heat exchanger 60 is configured to raise the inlet temperature of the torrefaction gas stream 34 into the heat exchanger 60 from about 500° F.±100° F. to an outlet temperature of about 700° F.±150° F. In doing so the temperature of the other isolated gas stream 35 in the heat exchanger 60 is necessarily lowered before exiting the heat exchanger 60 via an outlet conduit 66. The temperature of the other isolated gas stream 35, however, is still sufficiently hot to be useful in other processes, such as, for example, drying the biomass particles prior to entry in the biomass torrefaction system 10. Accordingly, in some embodiments, the gas stream 35 discharged from the heat exchanger 60 via the outlet conduit 66 may be routed to a dryer system 70 (FIG. 2) or other device, as represented by the arrow labeled 68. In some embodiments, the discharged gas stream 35 may be routed back to the inlet of the heat exchanger 60 and blended with other heated gas having a higher temperature, such as, for example, a remote burner, to regulate the inlet temperature of the heat exchanger 60 to a desired level or to fall within a desired temperature range.

Although the illustrated embodiment of the heat source 30 of FIG. 1 is shown as a gas-to-gas heat exchanger 60, it is appreciated that other various heat sources 30 may be provided. For example, in some embodiments, an electric immersion-type heat source may be provided within the path of the gas stream 34 of the biomass torrefaction system 10. In other embodiments, low oxygen burners may be directed directly into the system 10 to heat the gas stream 34 without significantly increasing the oxygen level within the system 10. Irrespective of the heat source 30, however, it is beneficial to isolate the gas stream 34 in a recirculating manner to facilitate maintenance of a low level oxygen environment within the reactor drum 12 that is conducive to torrefying biomass particles.

Figure 2:
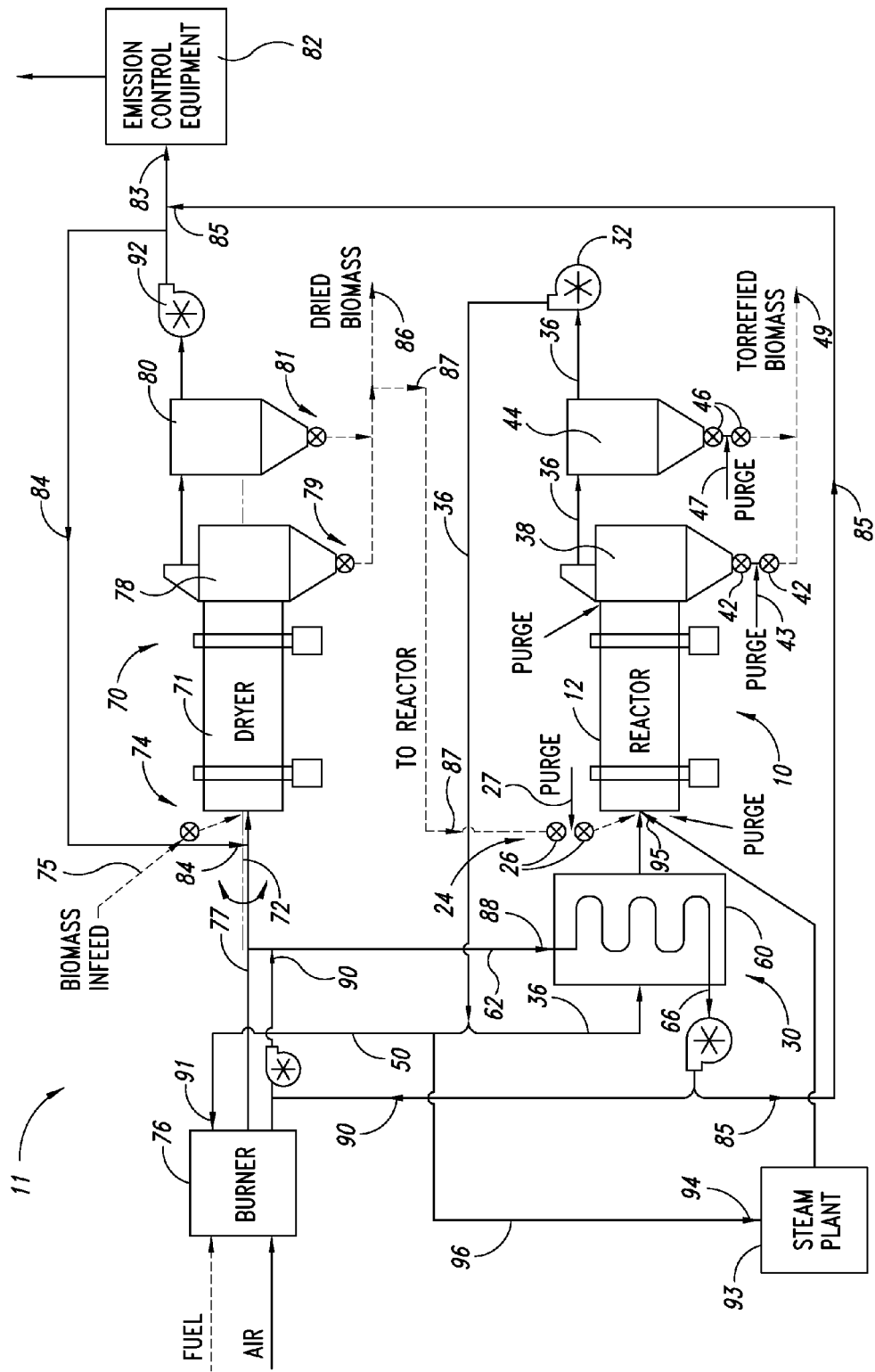
FIG. 2 is a schematic diagram of an integrated biomass processing system according to one embodiment.
Figure 3:
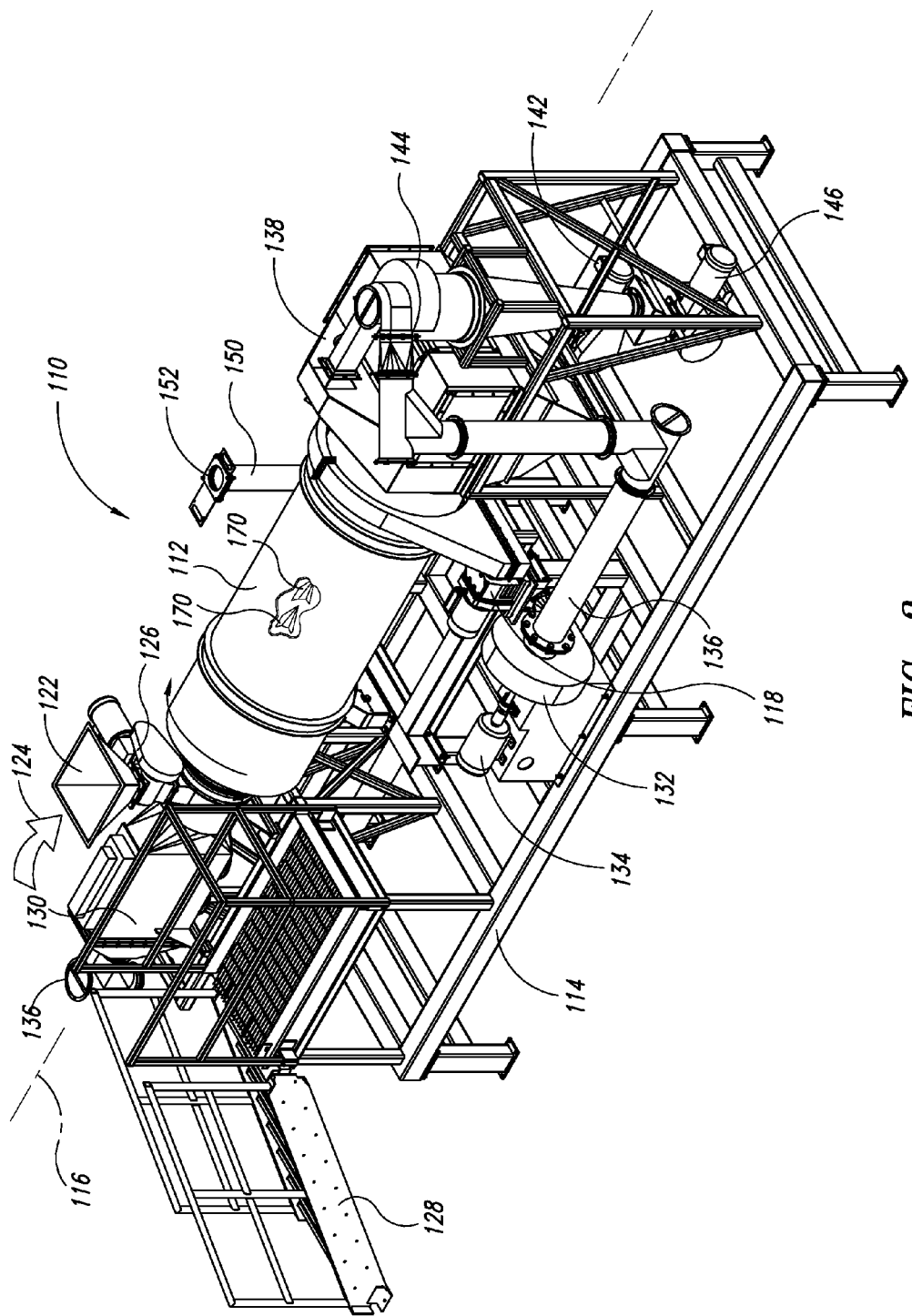
FIG. 3 is a isometric view of a biomass torrefaction system according to another embodiment.
Figure 4:
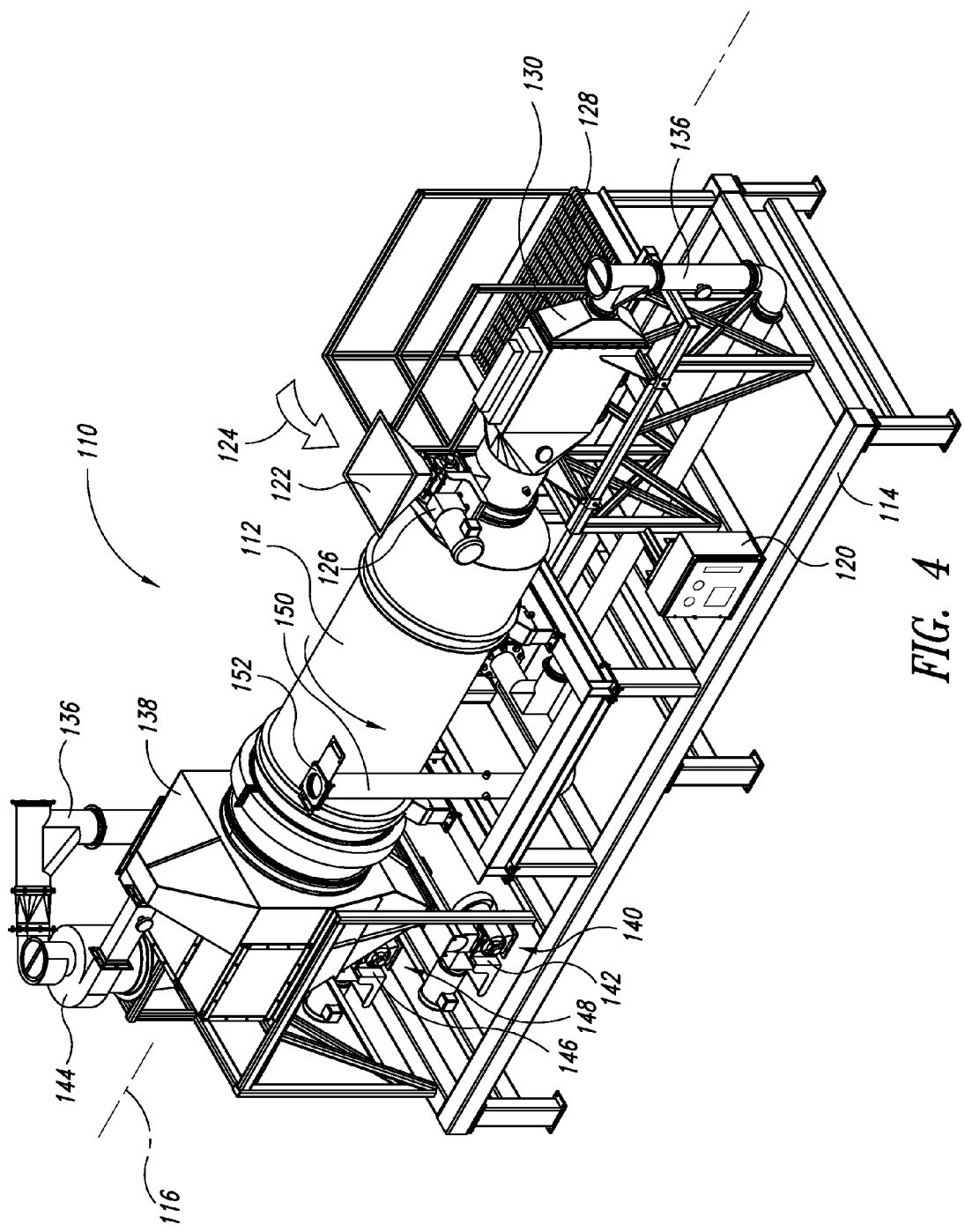
FIG. 4 is a rear isometric view of the biomass torrefaction system of FIG. 3.
Figure 5:
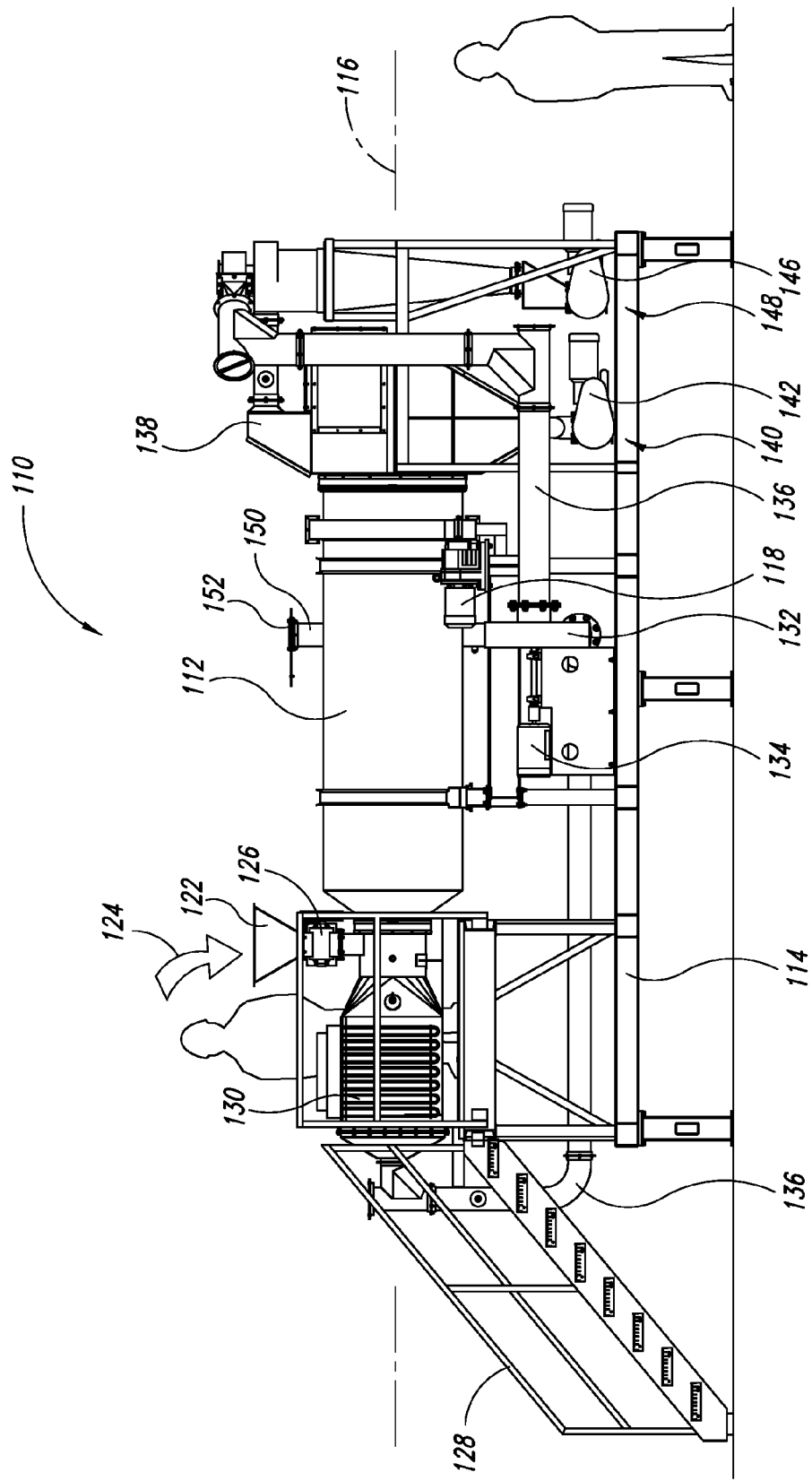
FIG. 5 is a side elevational view of the biomass torrefaction system of FIG. 3.
Figure 6:
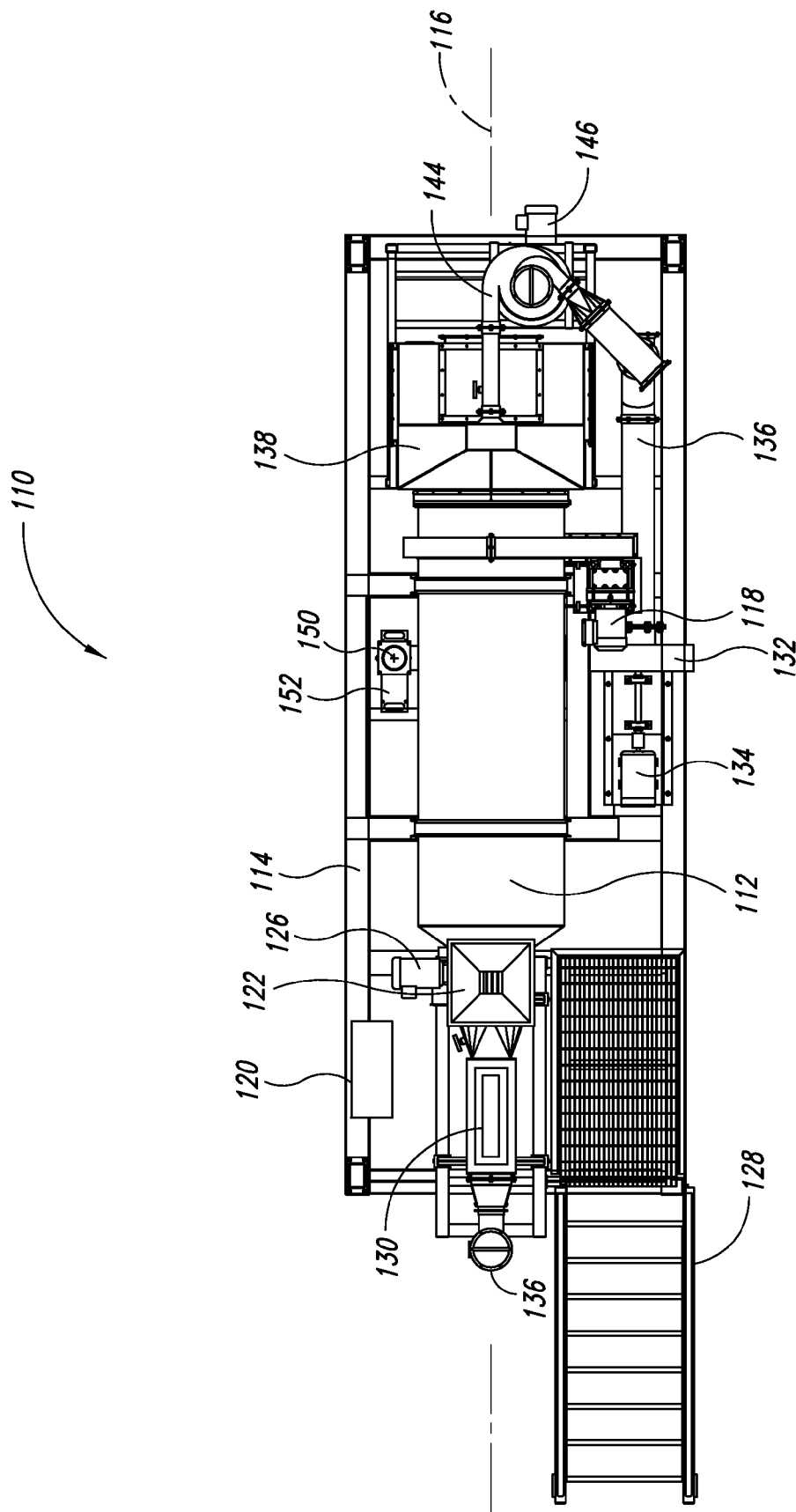
FIG. 6 is a top plan view of the biomass torrefaction system of FIG. 3.

At the downstream end of the reactor drum 12, there is provided a separator hopper 38 for collecting torrefied biomass particles (e.g., torrefied wood chips, torrefied giant cane chips, other torrefied cellulosic biomass) as the particles exit the reactor drum 12. These particles are then fed mechanically and/or under the force of gravity towards an outlet 40 for collection. One or more airlock devices 42 are coupled to the outlet 40 for substantially preventing oxygen from infiltrating the system 10 as the torrefied particles are withdrawn from the system 10. Smaller particles (e.g., torrefied wood fines, torrefied giant cane fines, other torrefied cellulosic biomass) which may pass through the separator hopper 38 can be filtered and removed from the gas stream 34 by a filtering device 44, such as, for example a cyclonic type filtering device. One or more additional airlock devices 46 may be coupled to a secondary outlet 48 for removing the filtered material from the system 10 without introducing significant amounts of oxygen into the system 10. In some embodiments, a chamber or space between a pair of sequentially aligned airlocks 42, 46 may be coupled to an inert or semi-inert gas source for selective purging of the chamber or space, as represented by the arrows labeled 43, 47 (FIG. 2). In some embodiments, the torrefaction system 10 may include a cyclonic type filtering device in lieu of a hopper 38 to separate and/or filter torrefied biomass particles from the gas stream 34. In some embodiments, the torrefaction system 10 may include one or more pneumatic discharge devices (not shown) to discharge torrefied biomass particles from the torrefaction system 10.

As previously described, the gas stream 34 is drawn or forced through the reactor drum 12 and returned to the heat source 30 (after separating torrefied particles, chips, fines, dust and/or any debris) under the influence of the fan device 32. While the substantial majority of the gas is recirculated, some gas may be diverted to exhaust ducting 50. The gas exhausted through the exhaust ducting 50 can be used elsewhere in the process or another process, as represented by the arrow labeled 52. For instance, the exhaust gas may be used as fuel to generate heat to aid the heat source 30 in increasing the temperature of the gas stream 34. The exhaust ducting 50 can include a variable position damper 54 which may be used to balance the pressure inside the reactor drum 12 from slightly negative to slightly positive. Depending on the setting, this can be used to inhibit oxygen from entering the system 10.

FIG. 2 shows a schematic of an integrated biomass processing system 11 according to one example embodiment. The integrated biomass processing system 11 includes, among other things, the biomass torrefaction system 10 described above and a dryer system 70 which is configured to dry biomass particles prior to introduction into the torrefaction system 10. In some embodiments, the biomass torrefaction system 10 is configured to receive biomass particles having a moisture content reduced to below twenty percent moisture content, wet-weight basis by the dryer system 70. In some embodiments, the biomass particles may be wood chips having an average particle size between about 1/16 cubic inch and about one cubic inch and having an intial moisture content above forty percent moisture content, wet-weight basis. In some embodiments, the biomass particles may have a substantially consistent size (less than ten percent difference), and in other embodiments, the size of the particles may vary by ten percent, twenty percent, thirty percent or more.

According to the illustrated embodiment of FIG. 2, the dryer system 70 includes a rotary drum 71 which is supported so as to rotate about its longitudinal axis 72. The dryer system 70 further includes an inlet 74 for receiving biomass particles that are to be processed, as represented by the arrow labeled 75. The biomass particles may be fed to the inlet 74 via a conveyor or other conventional material transport mechanism.

The dryer system 70 is coupled to a burner 76 which is configured to feed a heated gas stream via ducting 77 through the rotary drum 71 and intermittingly carry biomass particles through the drum 71 as it rotates. The heated gas stream simultaneously dries the biomass particles as the gas stream propels the particles through the rotary drum 71. The burner 76 may be configured to burn bark, hogged fuel or other fuels to heat the gas stream fed to the dryer system 70. The gas stream entering the dryer system 70 may also be supplemented or blended with other gas streams of the integrated biomass processing system 11 as described in further detail elsewhere.

At the downstream end of the rotary drum 71, there is provided a separator hopper 78 for collecting dried biomass particles (e.g., dried wood chips, dried giant cane chips, other dried cellulosic biomass) as the particles exit the rotary drum 71. These particles are then fed mechanically and/or under the force of gravity towards an outlet 79 for collection for subsequent use or packaging. Smaller particles and dust (e.g., dried wood fines, dried giant cane fines, other dried cellulosic biomass) which may pass through the separator hopper 78 are filtered and removed from the gas stream by a filtering device 80, such as, for example a cyclonic type filtering device. These particles are fed towards a secondary outlet 81 for subsequent use or packaging. In some embodiments, the dryer system 70 may include a cyclonic type filtering device in lieu of a hopper 78 to separate and/or filter dried biomass particles from the gas stream. In some embodiments, the dryer system 70 may include one or more pneumatic discharge devices (not shown) to discharge dried biomass particles from the drier system 70.

A fan device 92 may be provided to draw or force the gas stream through the rotary drum 71 and to route exhaust gas from the rotary drum 71 toward environment emission control equipment 82 to process the exhaust of the dryer system 70 before release to the environment or to other systems, as represented by the arrow labeled 83. As an example, the emission control equipment 82 may include a wet electrostatic precipitator (WESP) to facilitate the removal of submicron sized solid particles and liquid droplets from the exhaust gas stream. The emission control equipment 82 may further include a regenerative thermal oxidizer (RTO) to destroy air toxics and volatile organic compounds (VOCs) that may be present in the exhaust gas. In some embodiments, an RTO may be provided which uses natural gas to heat the exhaust gasses to about 1500° F. where VOCs are oxidized. In other embodiments, torrefier off-gasses may be used for heating of the RTO which may significantly reduce the operating cost of the RTO since natural gas is otherwise a significant cost in operating such equipment.

At least a portion of the exhaust from the dryer system 70 may be routed or recycled back towards the inlet 74 of the rotary drum 71 and combined with the heated gas stream from the burner 76 to dry the biomass particles which are continuously fed into the rotary drum 71, as represented by the arrows labeled 84. Additional gases from the outlet of the heat exchanger 60 of the torrefaction system 10 may also be combined with the exhaust gases from the dryer system 70 for cleansing prior to discharge into the environment and/or for introduction back into the dryer system 70, as represented by the arrows labeled 85.

According to the illustrated embodiment of FIG. 2, the dried biomass particles (e.g., dried wood chips and fines) may be routed to another location for subsequent processing, storage or packaging of the dried biomass particles as a standalone commodity, as represented by the arrow labeled 86. A portion or the entire supply of the dried biomass particles may be routed to the torrefaction system 10 for subsequent processing, as indicated by the arrow labeled 87.

As can be appreciated from FIG. 2, the dried biomass particles generated via the dryer system 70 may serve as input material for the torrefaction system 10. In some embodiments, the dried biomass particles may have an average moisture content below twenty percent moisture content, wet-weight basis when entering the torrefaction system 10. In other embodiments, the average moisture content of the dried biomass particles may be between about five percent moisture content, wet-weight basis and about fifteen percent moisture content, wet-weight basis. In still other embodiments, the average moisture content of the dried biomass particles may be greater than twenty percent moisture content, wet-weight basis.

Although the dryer system 70 is illustrated as rotary drum type dryer system, such as those designed and marketed by Teal Sales Incorporated, the assignee of the present application, it is appreciated that other dryer systems may be utilized in connection with embodiments of the present invention, including, for example, kilns having rotary screw and conveyor bed type conveyance mechanisms. Accordingly, embodiments of the biomass processing systems described herein are not limited to the specific dryer systems illustrated, but may incorporate a wide range of conventional dryer systems.

With continued reference to FIG. 2, the heat source 30 is shown as a gas-to-gas heat exchanger 60 which is configured to receive a heated gas stream from the burner 76, as indicated by the arrow labeled 88. The heated gas stream entering the heat exchanger 60 may be blended with gases from an output of the heat exchanger 60, as represented by the arrows labeled 90, to regulate the input temperature of the heated gas stream entering the heat exchanger 60. In some embodiments, the inlet temperature of the gas stream entering the heat exchanger may be between about 600° F. and about 1400° F., and in some embodiments, the inlet temperature of the gas stream entering the heat exchanger 60 may be between about 800° F. and about 1000° F. The recirculating gas stream of the torrefaction system 10 passes through the heat exchanger 60 and is heated, according to some embodiments, to a reactor drum inlet temperature of at least 500° F. After passing through the reactor drum 12 the heated gas stream has a reactor drum outlet temperature of at least 400° F. Consequently, the biomass particles which are passed through the torrefaction reactor drum 12 during operation are directly subjected to a heated gas stream having a temperature at least 400° F. over the entire length of the reactor drum 12. In some embodiments, the reactor drum inlet temperature is about 700° F.±150° F. and the reactor drum outlet temperature is about 500° F.±100° F. The reactor drum inlet and reactor drum outlet temperatures of the heated gas stream may be monitored with appropriate temperature sensors and controlled via a generic or cascaded control loop to maintain the temperature gradient through the reactor drum at a desired level during operation.

Exhaust gases from the torrefaction process, which include hydrocarbon compounds boiled out of the biomass particles, water vapor and any ambient air that leaks into the system may be routed, according to some embodiments, to the burner 76 for combustion, as indicated by the arrow labeled 91. In this manner, energy contained in the exhaust gasses can be utilized to heat a heat transfer medium for use in the heat exchanger 60 to maintain the heated gas stream 34 flowing through the reactor drum 12 at a desired elevated inlet temperature. Again, in some embodiments, the reactor drum inlet temperature may be about 700° F.±150° F. and the reactor drum outlet temperature may be about 500° F.±100° F. The reactor drum temperature gradient may be controlled through a cascaded control loop which sets the reactor drum inlet temperature. The reactor drum inlet temperature may be controlled, for example, by varying the amount of heated gas fed to the heat exchanger 60 from the burner 76. In some embodiments, the burner 76 may be configured to burn bark, hogged fuel or other fuel to heat the gas stream 35 fed through the heat exchanger 60. Again heating of this gas stream 35 may be supplemented with the combustion of exhaust gases from the torrefaction system 10, as represented by the arrow labeled 91.

FIGS. 3 through 8 illustrate a biomass torrefaction system 110 according to another example embodiment similar to the biomass torrefaction systems 10 described earlier, but with additional structural details and a different example heat source 130. The system 110 includes a reactor drum 112 which is supported on a structural frame 114 to rotate about a horizontal axis of rotation 116. The reactor drum 112 is driven by a drive motor 118 which may be electrically coupled to a control system for selectively controlling the rotation of the reactor drum 112 and optionally adjusting the speed thereof. The control system includes a control panel 120 with appropriate controls (switches, dials, gauges, etc.) for selectively controlling and monitoring the system 110. Other gauges and controls (e.g., sensors, valves, etc.) may be remotely located and coupled to specific components of the system for monitoring and control purposes.

The system 110 further includes an inlet 122 in the form of a chute for receiving biomass particles that are to be processed, as represented by the arrow labeled 124. An airlock or dual airlock 126 with optional inert or semi-inert gas purging or similar device is coupled to the inlet 122 to substantially prevent oxygen from entering the system 110 when biomass particles are input. The biomass particles may be fed to the inlet 122 via a conveyor or other conventional material transport mechanism. The rate of introduction of biomass particles may be monitored and controlled to optimize or tailor characteristics of the resultant torrefied biomass particles. Stairs 128 or other access devices may be provided for a user to access the inlet 122 and other components of the system 110 for monitoring, maintenance and other purposes.

The system 110 also includes a heat source 130 disposed upstream of the reactor drum 112 for supplying heat to a gas stream that is generated in the system 110 by a fan device 132, which may be, for example, an induced draft fan device or a forced draft fan device. The fan device 132 is driven by a drive motor 134 to draw or force gas through the reactor drum 112 and circulate it back to the heat source 130 to be reheated and supplied to the reactor drum 112 in a recirculating manner. Gas ducts 136 are appropriately sized and coupled to at least the reactor drum 112, heat source 130 and fan device 132 for this purpose.

At the downstream end of the reactor drum 112, there is provided a separator hopper 138 for separating torrefied biomass particles from the gas stream as the particles exit the reactor drum 112. These particles are then fed mechanically and/or under the force of gravity towards an outlet 140 for collection for subsequent use or packaging. An airlock device 142 is coupled to the outlet 140 for substantially preventing oxygen from infiltrating the system 110 as the torrefied particles are withdrawn. Smaller particles and dust which may pass through the separator hopper 138 are filtered and removed from the gas stream by a filtering device 144, such as, for example a cyclonic type filtering device. Another airlock device 146 may be coupled to a secondary outlet 148 for removing the filtered material from the system 110 without introducing significant amounts of oxygen to enter the system 110. In some embodiments, the system 110 may include a cyclonic type filtering device in lieu of a hopper 138 to separate and/or filter torrefied biomass particles from the gas stream passing through the reactor drum 112. In some embodiments, the system 110 may include one or more pneumatic discharge devices (not shown) to discharge torrefied biomass particles from the system 110.

As previously described, the gas stream is drawn or forced through the reactor drum 112 and returned to the heat source 130 (after separating torrefied particles, dust and any debris) under the influence of the fan device 132. While the substantial majority of the gas is recirculated to the reactor drum 112, some gas is diverted to an exhaust stack 150. The gas exhausted through the stack 150 can be recaptured for use elsewhere in the process or another process, such as, for example, use as fuel to generate heat. The stack 150 can include a variable position damper 152 which may be used to balance the pressure inside the reactor drum 112 from slightly negative to slightly positive. Depending on the setting, this can be used to inhibit oxygen from entering the system 110.

Figure 7:
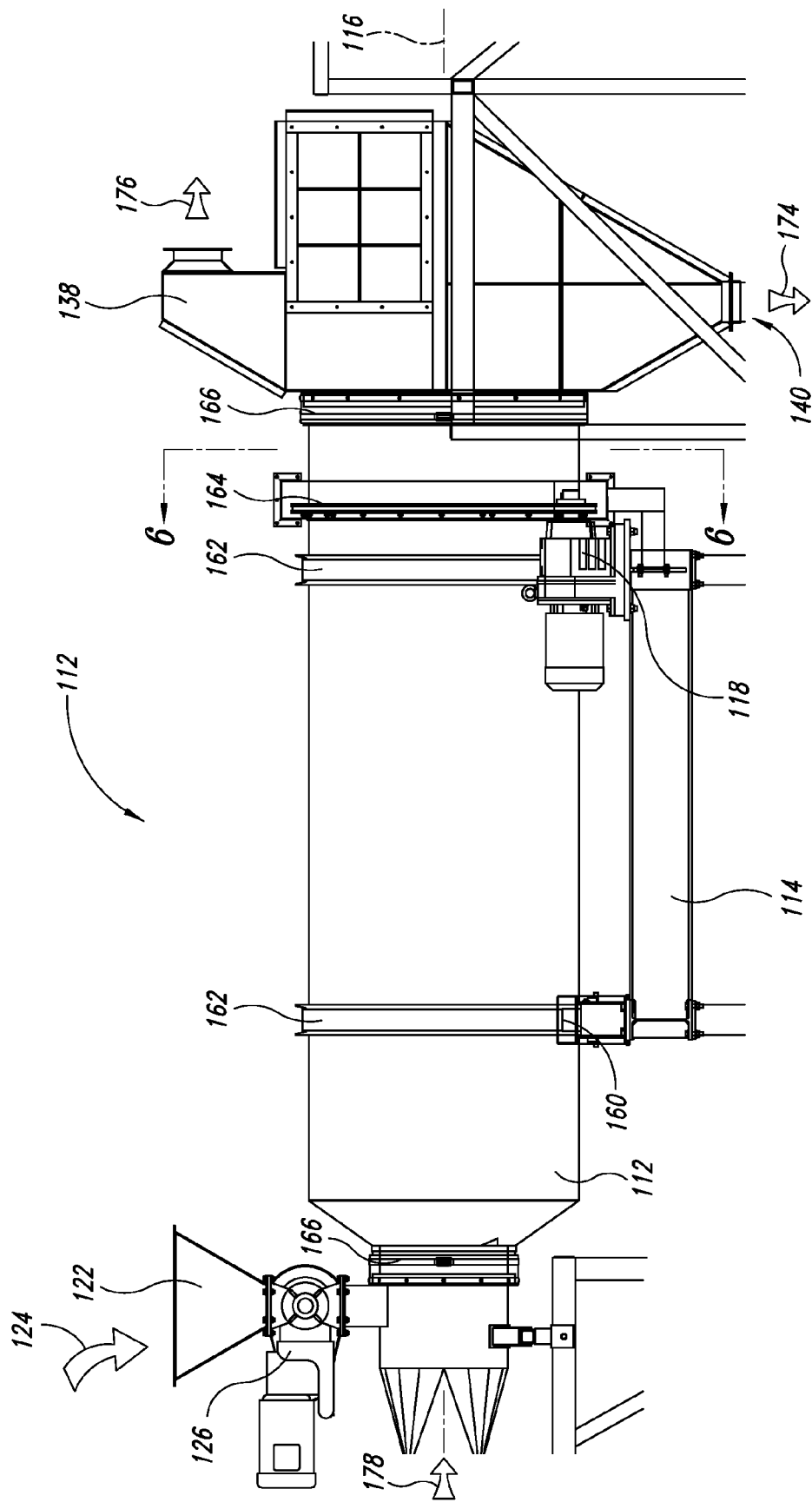
FIG. 7 is a side elevational view of a reactor drum and adjacent components of the biomass torrefaction system of FIG. 3.
Figure 8:
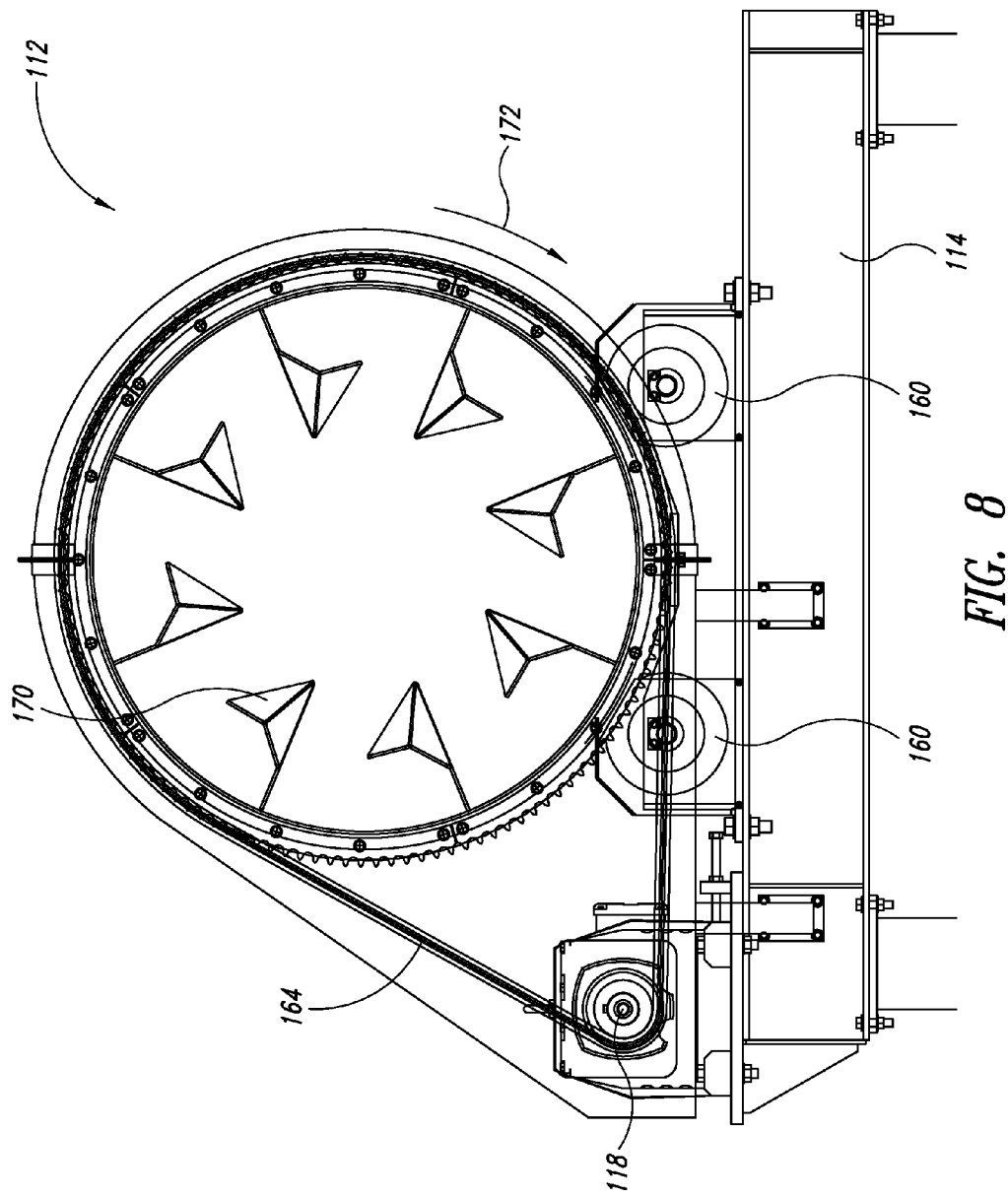
FIG. 8 is a cross-sectional view of the reactor drum of FIG. 7 taken along line 8-8.

Further details of the reactor drum 112 will now be described with reference to FIGS. 7 and 8. As shown in the illustrated embodiment, the reactor drum 112 is supported in a horizontal orientation on a number of rollers 160. The rollers 160 contact the drum 112 along bearing tracks 162 that are secured to a circumference of the drum 112. The diameter of the drum 112 may be three, four, five feet or more and may be configured to receive and process over fifty tons of torrefied biomass particles per hour.

The drive motor 118 is coupled to a drive belt or chain 164 and controlled via the control system to selectively rotate the drum 112 at various speeds, such as, for example, about 3 rpm or more or less. High precision seals 166 are disposed between the rotating drum 112 and static components to prevent the infiltration of oxygen into the system. In this manner, the seals 166 and other features of the system are able to maintain the gas stream at a consistent low level of oxygen by creating a substantially sealed vessel.

Within the reactor drum 112, there are a number of lifting flights 170 spaced circumferentially at each of a plurality of locations along a longitudinal length thereof. The density of the lifting flights 170 may be designed to suit various needs of the system 110 and may be dependent on a number of inter-related factors, such as, for example, the speed of rotation of the reactor drum 112, the rate of material fed into the system 110, and the speed of the fan device 132 or strength of the heated gas stream passing through the reactor drum 112. The flights 170 are configured to lift biomass particles as the reactor drum 112 rotates in the direction indicated by arrow 172 and then direct and shower the biomass particles into the gas stream to be intermittingly carried along the length of the reactor drum 112 predominately by the kinetic energy of the gas stream and simultaneously torrefied. This is advantageous in that the transport mechanism for the biomass particles provides a highly efficient medium for transferring heat to the particles directly. Accordingly, large volumes of biomass particles can be processed by a system with reduced energy demands. In addition, the throughput or rate of torrefied biomass particles (tons/hour) may be relatively greater when compared to conventional torrefaction systems of generally comparable size.

The biomass particles reside in the drum 112 for a period of time and then are subsequently discharged into the separator hopper 138 or other separating device and routed in the direction indicated by the arrow labeled 174 for further handling. A predominate or substantial portion of the gas stream is routed in the direction indicated by the arrow labeled 176 and recirculated, heated and reintroduced into the reactor drum 112 as indicated by the arrow labeled 178.

The system 110 thus enables a continuous torrefaction process that involves the introduction of biomass particles into a rotating reactor drum 112 via an airlock or airlocks 126 to maintain a low oxygen level inside the torrefaction system 110 which is conducive to torrefying biomass particles. The particles are conveyed through the drum 112 by the kinetic energy of a heated gas stream that is generated by creating an induced draft of forced draft via a fan device 132 connected by a duct 136 to the outlet of the drum 112. There is also a heat source 130 upstream of the drum 112, such as, for example, an electrical immersion-type duct heater (FIG. 3) or a gas-to-gas heat exchanger (FIG. 1). The fan device 132 draws or forces gas across or through the heat source 130 and through the drum 112. Beneficial to the viability of the process is the recirculation of gas exiting the drum 112 back to the heat source 130 for reheating. Also beneficial to the viability of the process is the ability of the heated gas stream to directly heat the biomass particles under a low oxygen environment as the gas stream simultaneously transports the biomass particles intermittently through the reactor drum 112, as discussed in more detail elsewhere.

There is of course a certain flow of gas that is discharged from the system 110 (whether to the external environment or another related or unrelated process component) which is substantially equal to the sum of the gases being driven off of the biomass particles due to heating (including water evaporation) and any leakage that may enter the system 110.

The interior of the drum 112 contains specialized lifting- and fall-distance-control flights 170 that lift and shower the particles as the drum 112 rotates thereby exposing the particles to the heated gas stream causing moisture within the particles to be evaporated. As the particles shower within the drum 112 the moving gas within the drum 112 causes them to be conveyed forward. It generally takes a number of rotations of the drum 112 to provide enough forward progress of the particles to gain passage through the length of the drum 112. The showering and conveying process within the drum 112 also classifies the particles. Lighter, smaller particles pass through the drum 112 faster than heavier, larger particles. This allows large particles to remain in the drum 112 for a relatively longer residence time and creates a more uniform end product (i.e., large and small particles may be processed together to have similar end characteristics despite differences in mass and volume). For example, in some embodiments, particle size may vary within a particular run of torrefied biomass particles by ten, twenty or thirty percent or more while the energy density and moisture characteristics of the particles are maintained relatively consistent irrespective of particle size. In some embodiments, the flights 170 may be designed to vary with respect to location and/or flight density in different embodiments to affect the residence time of the biomass particles within the reactor drum 112.

When using the system 110 to torrefy biomass particles the heat source 130 is responsible for adding heat to a recirculating gas system within the system 110. The heated gas stream within this recirculating gas system in turn directly heats the biomass particles as they are conveyed through the system 110. In this manner, the heated gas stream directly heats and transports the biomass particles simultaneously. This is advantageous in that the transport mechanism for the biomass particles provides a highly efficient medium for transferring heat to the particles directly. Accordingly, large volumes of biomass particles can be processed by a system with reduced energy demands. In addition, the throughput or rate of torrefied biomass particles (tons/hour) may be relatively greater when compared to conventional torrefaction systems of generally comparable size. This advantageously enables the systems described herein to be implemented in a particularly commercially feasible manner.

Elements of the heat source 130 can provide heat by any readily available energy source. In some embodiments, for example, direct heat may be applied to the gas stream by an electric element (e.g., electrical immersion-type duct heater 130). In other embodiments, heat may be provided to the gas stream through a gas-to-gas heat exchanger 60 (FIGS. 1 and 2) coupled to a combustion and/or waste heat system (e.g., burner 76 of FIGS. 1 and 2). In another embodiment, low oxygen burners may be directed directly into the system 110 to heat the gas stream without significantly increasing the oxygen level within the system 110. In some embodiments, exhaust gas that is discharged from the stack 150 may be used as part of the process heating fuel. Irrespective of the heat source 130, very little additional oxygen is added to the system 110 throughout the heating portion of the process.

The torrefaction systems and processes are based on a heat and energy balance that balances the energy required with the process rate, heating source and required residence time. Embodiments of the torrefaction systems and methods described herein are particularly well suited to manipulate and control these factors and provide systems and methods that are readily scalable to meet various industry needs.

For instance, residence time of the particles within the drum 112 may be controlled by various design and process factors. For example, the speed and size of the fan device 132 may be selected to adjust the velocity of the circulating heated gas within the drum 112. In addition, the speed and volume of the heated gas stream can also be adjusted by a fan inlet damper of the fan device 132. As another example, the rotation speed of the drum 112 may be set higher of lower to adjust the rate of the lifting and showering effect within the drum 112 thus creating more or less time in which the particles are in suspension. Further, since the flights 170 may be designed to work over a wide range of rotational speeds, the drum 112 rotational speed can be selectively adjusted by appropriate controls (such as a variable speed drive motor) to adjust the residence time. Also, the density of the flights 170 within the drum 112 can be used to change the flow conditions inside the drum 112 giving an individual design an inherent shorter of longer residence time. Still further, the size and shape of the flights 170 can be altered to meet the needs of the material processed and create a more or less pronounced showering effect, thereby impacting the residence time in the drum 112.

In some embodiments, the flights 170 may be secured to the drum 112 in a particular density and arrangement to optimize or tailor characteristics of the resultant torrefied biomass particles. The length of the drum 112 can also be varied in initial design to create more or less residence time. In addition, particle loading conditions can be varied to create more or less resistance to the gas stream within the drum 112, thus affecting residence time. For example, in some embodiments, a relatively greater volumetric flow rate of biomass particles may be set to crowd the interior of the drum 112 and slow the progression of the particles through the drum 112. Conversely, a relatively smaller volumetric flow rate of biomass particles may be set to reduce crowding in the interior of the drum 112 and speed the progression of biomass particles through the drum 112.

The oxygen level inside the drum 112 may likewise be controlled by various design and process factors. For example, the mechanical design of the particle inlet can be selected to include, for example, an airlock, a gas-purged double airlock, screw mechanisms or the like, with each mechanism having a different level of ability to prevent the infiltration of oxygen. Preferably, the amount of oxygen that enters the system 110 with the particles is minimized, but is likely to vary with design according to particle size and/or desired production rate of the processed biomass. In addition, the incoming moisture content of the particles can be varied to control oxygen level. During processing, the resulting evaporated water partially displaces oxygen within the system 110, and thus the level of moisture can be varied to suit production requirements (e.g., less initial moisture means less energy required to torrefy the particles, and more initial moisture results in less oxygen in the system). Still further, it is recognized that there is a net addition of gas to the system as volatiles and moisture are evaporated from the particles. As previously described, this excess gas may be exhausted from the system 110 via a stack 150 and may, according to some embodiments, be recaptured for use elsewhere in the process or another process, such as, for example, use as fuel to generate heat. The stack 150 can include a variable position damper 152 which may be used to balance the pressure inside the drum 112 from slightly negative to slightly positive. Depending on the setting of the damper 152, this can be used to inhibit oxygen from entering the system 110.

In some embodiments, many of the various operational parameters discussed above as well as other operational parameters may be adjusted (manually or automatically) during operation. In other embodiments, operational parameters may be established prior to operation. Irrespective of the particular control scheme, the ability to independently control various operational parameters of the systems described herein provide for particularly versatile biomass torrefaction systems and methods that are adaptable to changing conditions, such as, for example, the moisture content of the biomass particles selected to be processed and a desired energy density of resultant torrefied biomass particles which may vary.

The system 110 may also be outfitted with precision seals 166 at rotating to static connections and other low leakage connections and components to provide a particularly well sealed vessel to maintain consistent low levels of oxygen within the system 110.

FIGS. 9 through 11 illustrate one example embodiment of a precision seal assembly 266 that may be used to substantially eliminate the infiltration of oxygen of the surrounding environment into the reactor drum 212 at a rotational interface. As shown best in FIG. 10, the seal assembly 266 may include rigid flange structures 270 which are coupled to a flange 268 of the reactor drum 212 to rotate in unison therewith. The flange structures 270 may extend toward stationary flange structures 272 positioned upstream of the drum 212 with respect to the flow direction F. A gap or space between the stationary flange structures 272 and the rotating flange structures 270 may be spanned by seal elements 274 to define an internal chamber 276. This internal chamber 276 may be purged intermittingly with inert or semi-inert gas to maintain an inert or semi-inert gas barrier between an environment external to the seal assembly 266 and an internal environment of the reactor drum 212.

The seal elements 274 may include internal stiffeners to provide sufficient rigidity to maintain the seal elements 274 in sealing contact with the rotating flange structures 270 as the drum 212 rotates during operation about the rotational axis 216. Additional biasing elements 280 may also be provided to urge one or more of the seal elements 274 into firm contact with the rotating flange structures 270. In the illustrated embodiment, the biasing elements 280 are shown as overlapping spring elements extending from the stationary flange structures 272 positioned upstream of the reactor drum 212 to a seal element 274 overlying one of the rotating flange structures 270. As shown in FIG. 11, the seal elements 274 may be spliced together in the manner shown to prevent fraying of the seal elements 274 as the reactor drum 212 and flange structures 270 rotate in the direction R during operation.

Although each of the flange structures 270, 272 are illustrated as L-shaped structural members, it is appreciated that the size and shape of the flange structures 270, 272 may vary significantly. Irrespective of size and shape, however, it is beneficial, according to some embodiments, to provide an isolated internal chamber 276 which may be selectively purged as needed (e.g., during system startup, shutdown or fault conditions) with inert or semi-inert gas to assist in maintaining the internal environment within the reactor drum 212 at a consistent low level of oxygen. In addition, irrespective of the size, shape and configuration of the elements of the seal assembly 266, a redundant seal interface is beneficial to help minimize leakage into the internal environment.

It is further appreciated that other seals and sealing devices (e.g., airlocks or dual airlocks) may be provided at other potential leak points in the system, including, for example, at the biomass particle inlets and outlets. In addition, substantially sealed chambers may also be formed in these locations between the torrefaction system and the external environment. These chambers may be coupled to inert or semi-inert gas sources for intermittent purging of the chambers with inert or semi-inert gas, such as, for example, at system startup, shutdown or during fault conditions. Purging these chambers may advantageously ensure that no or very little oxygen from the surrounding environment infiltrates the recirculating gas of the torrefaction system. In some embodiments, the system may be equipped with dual infeed and discharge airlocks that are arranged in series with inert or semi-inert gas purging enabled between the airlocks.

Various safety devices may also be incorporated into the torrefaction systems to enhance operational safety. For instance, the systems may be equipped with vents that will rupture or open should a minor explosion or deflagration occur of sufficient magnitude to potentially cause equipment damage. As another example, spark detection and extinguishment systems may also be integrated into the torrefaction systems, such as, for example, spark detection and extinguishment systems and components marketed by GreCon, Inc. headquartered in Tigard, Oreg. In addition, system operational characteristics may be monitored, for example, by various sensors (e.g., temperature, pressure, oxygen, etc.), and the obtained operational data may be used to adjust and control the system as needed to enhance safety or to optimize the torrefaction process. In some embodiments, real time mass spectroscopy may also be used to identify compounds in the gas streams and to adjust or control the system as needed to enhance safety or to optimize the torrefaction process.

In some embodiments, steam from a separate boiler of a steam plant 93 (FIG. 2) which is fired by the off gas of the reactor drum 12 (as represented by the arrow labeled 94) or another fuel or heat source may be injected into the system 10 (as represented by the arrow labeled 95) to further control oxygen in the process or as a safety smothering and cooling stream and also may be used as an inert or semi-inert purge gas in the process. In addition, using steam as part of the process gas which passes through the reactor drum 12 may also improve heat transfer to the biomass particles. In some embodiments, the boiler may be heated by off gas routed thereto by ducting 96 coupled to the reactor drum 12. In other embodiments, the boiler may be heated by the burner 76 or another heat source. In some embodiments, upon a fault condition, steam may be introduced into the reactor drum 12 in sufficient quantities for smothering and cooling purposes. In this manner, operational safety of the torrefaction system 10 may be enhanced, Overall, by knowing the processes by which heat, residence time and oxygen levels are controlled and by having the flexibility through initial design and the numerous process variables described herein, embodiments of the biomass torrefaction systems and methods can be set up to accommodate a variety of biomass feed stocks in a variety of local conditions and provide the flexibility and control needed to achieve consistent torrefaction results. In some embodiments, for example, the torrefaction systems and methods may be configured to torrefy biomass particles in the form of wood chips at a minimum rate of one ton of torrefied biomass particles per hour with the resultant torrefied biomass particles having an energy density of at least 20 GJ/ton.

The torrefaction systems and methods described herein are particularly well suited to provide a continuous torrefaction process that has many benefits over conventional torrefaction systems, and in particular, batch systems and methods which require batch processing of biomass particles in a furnace, kiln or other similar device. The continuous nature of the torrefaction systems and methods described herein enable, among other things, relatively higher production rates. In addition, the efficiency with which biomass particles may be processed with the systems and methods enable high material throughput at relatively lower energy demands.

Although embodiments of the torrefaction systems and methods described herein are illustrated in the figures as including reactor drums which rotate about a horizontally aligned axis of rotation, it is appreciated that in some embodiments, the axis of rotation may be inclined. In such embodiments, gravity may play a significant role in transporting the biomass particles through the reactor drum. In addition, although embodiments of the torrefaction systems and methods are described herein as involving a heated gas stream passing through the reactor drum to carry or transport the biomass particles while simultaneously transferring heat to the biomass particles to torrefy them, it is appreciated that in some embodiments the biomass particles may be transported by alternate mechanisms (e.g., gravity, screw devices, conveyor devices, etc.) and subjected to a counter-flowing heated gas stream within the reactor drum to torrefy the biomass particles.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A biomass torrefaction system, comprising:
   an inlet to receive biomass particles;
   a reactor drum configured to rotate about an axis of rotation, the reactor drum having a plurality of flights positioned therein;
   a heat source to heat gas contained in the system to a temperature sufficient to torrefy the biomass particles during operation;
   a fan device coupled to the system to create, when the system is in operation, a heated gas stream through the reactor drum sufficient to intermittently transport the biomass particles along a longitudinal length of the reactor drum as the biomass particles are lifted by the flights and showered through the heated gas stream as the reactor drum rotates; and
   a duct system to recirculate at least a portion of gas exiting the reactor drum back to the heat source to reheat the gas for reintroduction into the reactor drum.

2. The biomass torrefaction system of claim 1 wherein the heated gas stream directly heats the biomass particles as the gas stream intermittently transports the biomass particles through the reactor drum.

3. The biomass torrefaction system of claim 1 wherein the plurality of flights are configured to regulate movement of the biomass particles through the reactor drum, thereby influencing a retention time of the biomass particles within the reactor drum.

4. The biomass torrefaction system of claim 3 wherein the plurality of flights include flights spaced around an inner circumference of the reactor drum in regular or irregular intervals and in at least three locations along the longitudinal length of the reactor drum.

5. The biomass torrefaction system of claim 1 wherein the plurality of flights interoperate with the heated gas stream to classify the biomass particles according to particle density by moving relatively denser particles with respect to similarly sized particles through the reactor drum more slowly.

6. The biomass torrefaction system of claim 1, further comprising:
ducting to dispel exhaust gas from the system;
control valves; and
dampers, the control valves and dampers positioned to regulate a pressure level within the system to inhibit the infiltration of oxygen into the system while enabling exhaust gas to exit the system.

7. The biomass torrefaction system of claim 1, further comprising:
ducting to route exhaust gas from the system to a remote device for use of the exhaust gas in an auxiliary or supplemental process.

8. The biomass torrefaction system of claim 7 wherein the remote device is a burner configured to utilize the exhaust gas to generate a heated medium for supplying heat via a heat exchanger to the gas which passes through the reactor drum during operation.

9. The biomass torrefaction system of claim 1, further comprising:
at least one airlock coupled between the inlet and the reactor drum to limit the amount of oxygen entering the system when receiving the biomass particles; and
at least one seal mechanism between the reactor drum and adjacent structures, the seal mechanism including a chamber between the reactor drum and an external environment and the seal mechanism coupled to an inert or semi-inert gas source for selective purging of the chamber during operation.

10. The biomass torrefaction system of claim 1, further comprising:
a steam plant coupled to the reactor drum to introduce steam into the reactor drum and assist in the torrefaction of the biomass particles.

11. The biomass torrefaction system of claim 1, further comprising:
a control system configured to independently control a plurality of operational parameters to regulate a torrefaction process of the biomass particles, the operational parameters including at least one of a reactor inlet temperature, a reactor outlet temperature, an average residence time, oxygen content of the heated gas stream and gas flow characteristics.

12. The biomass torrefaction system of claim 11 wherein the control system includes sensors for monitoring at least some of the operational parameters and the control system is configured to continuously or intermittingly adjust at least some of the operational parameters during operation to optimize the torrefaction process or tailor characteristics of the resultant torrefied biomass particles.

13. The biomass torrefaction system of claim 1 wherein the reactor drum is at least five feet in diameter and the system is configured to torrefy biomass particles at a minimum rate of one ton of torrefied biomass particles per hour, the torrefied biomass particles having an energy density of at least 20 GJ/ton.

14. A method of biomass torrefaction comprising:
rotating a reactor drum about an axis of rotation, the reactor drum having a plurality of flights positioned therein;
generating a heated gas stream through the reactor drum sufficient to intermittently transport biomass particles along a longitudinal length of the reactor drum and simultaneously torrefy the biomass particles as the biomass particles are lifted by the flights and showered through the heated gas stream as the reactor drum rotates; and
recirculating a portion of gas exiting the reactor drum back to an inlet of the reactor drum for torrefying biomass particles within the reactor drum.

15. The method of biomass torrefaction of claim 14, further comprising:
selectively varying at least some of a plurality of operational parameters to tailor characteristics of the resultant torrefied biomass particles, the operational parameters including at least one of a speed of the heated gas stream through the reactor drum, a volumetric flow rate of the heated gas stream through the reactor drum, a temperature of the heated gas stream through the reactor, a pressure level within the reactor drum, a speed of the rotation of the reactor drum, oxygen content of the heated gas stream, a moisture content of the biomass particles and a rate of introduction of the biomass particles into the reactor drum.

16. The method of biomass torrefaction of claim 14, further comprising:
routing exhaust gas to a device remote from the reactor drum for use of the exhaust gas in an auxiliary or supplemental process.

17. The method of biomass torrefaction of claim 14, further comprising:
passing biomass particles through the reactor drum at a minimum rate of one ton per hour, the biomass particles having an energy density of at least 20 GJ/ton after being torrefied within the reactor drum.

18. The method of biomass torrefaction of claim 14, further comprising:
drying the biomass particles in a rotary type dryer system prior to introduction in the reactor drum.

19. The method of biomass torrefaction of claim 14, further comprising:
venting the reactor drum upon a fault condition.

20. The method of biomass torrefaction of claim 14, further comprising:
introducing steam into the reactor drum to assist in the torrefaction of the biomass particles.

* * * * *